(12) United States Patent
Lumsden et al.

(10) Patent No.: US 10,927,021 B2
(45) Date of Patent: Feb. 23, 2021

(54) PROCESS FOR PRODUCING ZERO-VALENT IRON NANOPARTICLES AND TREATING ACID MINE DRAINAGE

(71) Applicant: Montgomery Chemicals LLC, Conshohocken, PA (US)

(72) Inventors: Charles A. Lumsden, Buckhead, GA (US); Mohottige Sujeewa Perera, Lansdale, PA (US)

(73) Assignee: MONTGOMERY CHEMICALS LLC, Conshohocken, PA (US)

( * ) Notice: Subject to any disclaimer, the term of this patent is extended or adjusted under 35 U.S.C. 154(b) by 197 days.

(21) Appl. No.: 16/012,986

(22) Filed: Jun. 20, 2018

(65) Prior Publication Data

US 2019/0218119 A1    Jul. 18, 2019

Related U.S. Application Data (60) Provisional application No. 62/618,880, filed on Jan. 18, 2018.

(51) Int. Cl.
| | | |
|---|---|---|
| C22B 15/00 | (2006.01) | |
| C02F 1/52 | (2006.01) | |
| C02F 1/70 | (2006.01) | |
| C02F 101/20 | (2006.01) | |
| C02F 103/10 | (2006.01) | |
| C02F 1/48 | (2006.01) | |
| C02F 1/66 | (2006.01) | |

(52) U.S. Cl.
CPC ............. *C02F 1/5236* (2013.01); *C02F 1/70* (2013.01); *C02F 1/488* (2013.01); *C02F 1/66* (2013.01); *C02F 2101/203* (2013.01); *C02F 2101/206* (2013.01); *C02F 2103/10* (2013.01)

(58) Field of Classification Search
CPC .................................. C22B 15/00; C22B 3/44
See application file for complete search history.

(56) References Cited

U.S. PATENT DOCUMENTS

| | | |
|---|---|---|
| 2,937,143 A | 5/1960 | Goren |
| 4,138,539 A | 2/1979 | Landolt et al. |
| 4,289,540 A | 9/1981 | Yong et al. |
| 5,286,806 A | 2/1994 | Neff et al. |
| 5,505,857 A | 4/1996 | Misra et al. |
| 5,530,069 A | 6/1996 | Neff et al. |
| 5,645,730 A | 7/1997 | Malachosky et al. |
| 5,879,564 A | 3/1999 | Farinato |
| 5,945,494 A | 8/1999 | Neff et al. |
| 6,667,374 B2 | 12/2003 | Hernandez-Barajas et al. |
| 6,866,689 B2 | 3/2005 | Lumsden et al. |

(Continued)

FOREIGN PATENT DOCUMENTS

| | | | |
|---|---|---|---|
| CN | 105458294 A | * | 4/2016 |
| WO | WO 0187775 A1 | * | 11/2001 |
| WO | 2007047481 A2 | | 4/2007 |

OTHER PUBLICATIONS

CN 105458294 A Machine Translation (Year: 2016).*

(Continued)

*Primary Examiner* — Scott R Kastler
(74) *Attorney, Agent, or Firm* — Paul & Paul (57) ABSTRACT

A process for treating acid mine drainage removes iron ions from the acid mine drainage in the form of zero-valent iron nanoparticles which can be subsequently used for environmental remediation.

18 Claims, 4 Drawing Sheets

(56) References Cited

U.S. PATENT DOCUMENTS

| | | |
|---|---|---|
| 7,033,507 B2 | 4/2006 | Zhuang |
| 7,674,526 B2 | 3/2010 | Feitz et al. |
| 2011/0147306 A1 | 6/2011 | Polizzotti et al. |

OTHER PUBLICATIONS

Tsukamoto et al. "Column Experiments for Microbial Treatment of Acid Mine Drainage: Low Temperature, Low pH, and Matrix Investigations." Water Research. vol. 38. pp. 1405-1418. (Year: 2004).*

D.B. Johnson, "Acid Mind Drainage Remediation Options: A Review," Science of the Total Environment 338 (2005), 3-14.

\* cited by examiner

PROCESS FOR PRODUCING ZERO-VALENT IRON NANOPARTICLES AND TREATING ACID MINE DRAINAGE

CROSS REFERENCE TO RELATED APPLICATION

This application claims the benefit of the priority of U.S. Provisional Application No. 62/618,880, filed Jan. 18, 2018, which is incorporated by reference herein in its entirety.

BACKGROUND OF THE INVENTION

1. Field of the Invention

The present invention relates to the treatment of acid mine drainage.

2. Brief Description of the Prior Art

Acid mine drainage is one of the most significant environmental pollution problems associated with the mining industry. The main cause of this pollutant is the creation of pyrite and sulphide minerals as water from rain and natural drainage moves through an underground mine. The mine's wastewater exposure to air upon discharge from the mine causes oxidation of the pyritic material which begins the leaching of sulfuric acid and metals. The phenomena is called acid mine drainage (AMD) and it can be found flowing from underground mine tunnels discharging water as small highly contaminated streams feeding larger streams during the process. Effluents are characterized by high concentrations of heavy metals and high acidity, a combination that in many cases causes severe environmental problems such as acidification and lethal poisoning of aquatic organisms. Metal concentrations, which can be high, differ depending on the area of the country. Abandoned and working mines continuously discharge mine drainage into surface and groundwater bodies. Thus, the mining industry faces enormous challenges.

Acid mine drainage is a national problem, but one-third of waters impacted by that problem are located in Pennsylvania, which, after over a century of coal extraction, has produced more coal tonnage than any other state in the U.S. AMD is Pennsylvania's single largest non-point source water pollutant, impacting 2500 miles of streams (PA DEP, 1999b). AMD is formed when mining activities expose pyrite (iron disulfide minerals) to water and oxygen. Upon exposure to water and oxygen, pyrite oxidizes to form acidic drainage rich in dissolved metals.

Untreated AMD can severely degrade both habitat and water quality of receiving streams. This degradation is manifested by an alteration in the macroinvertebrate community; specifically, there is a reduction in the diversity and total numbers of macroinvertebrates and massive shifts in community structure, favoring pollution tolerant species. In addition to the stress posed by a less abundant food source, fish are also negatively impacted by AMD directly. The primary causes of fish death in acid waters are loss of sodium ions from the blood and loss of oxygen in the tissues. AMD contaminated groundwater can corrode and encrust man-made structures, causing serious problems. For example, AMD can compromise well casings (water supply or oil and gas wells) which can lead to aquifer contamination. In the most severe cases, AMD renders waters unfit for human use and recreation.

Contamination of groundwater with organic chemicals has been addressed in one approach by reducing the polluting organic using zero-valent metals, such as iron. Nanoscale zero-valent iron is favored given the large surface area of zero-valent iron nanoparticles in comparision to granular iron.

In the past decade, the synthesis of iron nano particles has been intensively developed not only for its fundamental scientific application, but also for many technological applications. For example, U.S. Pat. No. 7,674,526 discloses a process for preparing nanoscale zero-valent iron using reduction of a metal ion solution with a dithionite compound which is disclosed to be advantageous in comparision to a process using ferric ion and sodium borohydride as the reductant.

The chemical composition of acid mine discharge can vary significantly from source to source, but often includes a variety of leached heavy metal ions, including ferric ion, ferrous ion, manganese ion, calcium ion, magnesium ion, and aluminum containing ions, as well as silica.

There is a continuing need for methods of treating acid mine drainage to ameliorate the environmental impact as well as a continuing need for materials useful for treating environmental damage from harmful organic compounds in ground.

SUMMARY OF THE INVENTION

The present invention provides a process for producing zero-valent iron and treating acid mine drainage. The process includes providing aqueous acid mine drainage feed stock including from 50 ppm to 500 ppm of metal ion selected from the group consisting of ferrous iron, ferric iron, and mixtures thereof at a pH of less than 6.9, preferably from 3.5 to 6.9. Preferably, the acid mine drainage feedstock is provided at a pH of from about 6.1 to 6.8. More preferably, the acid mine drainage feedstock is provided at a pH of from about 6.4 to 6.6.

The process further includes providing an alkali metal borohydride selected from the group consisting of sodium borohydride, potassium borohydride and mixtures thereof. In addition, the process further comprises mixing the alkali metal borohydride with the acid mine drainage feed stock to form an aqueous suspension of zero-valent iron. Preferably, the amount of alkali metal borohydride mixed with the acid mine drainage feedstock is sufficient to raise the pH of the aqueous suspension to no more than 8.3. Preferably, the amount of alkali metal borohydride is sufficient to raise the pH of the aqueous suspension to from about 7.90 to about 8.15.

Preferably, the rate of addition of the alkali metal borohydride to the acid mine drainage is controlled to control the particle size of the resulting zero-valent iron.

Preferably, the acid mine drainage feedstock includes from about 100 ppm to about 400 ppm of metal ion. More preferably, the acid mine drainage feedstock includes from about 200 ppm to about 300 ppm of metal ion. It is preferred that the metal ion comprises at least 90 percent by weight ferrous iron. Preferably, the process further comprises providing an inert atmosphere, and mixing the alkali metal borohydride with the acid mine drainage feedstock under an inert atmosphere. Preferably, the process further comprises separating the zero-valent iron from the aqueous suspension to provide separated zero-valent iron. In one aspect, the zero-valent iron is preferably separated by filtration. In another aspect, the zero-valent iron is preferably separated magnetically. Preferably, the process further comprises storing the separated zero-valent iron in a medium having less than 5 ppm dissolved oxygen, and preferably less than 2 ppm dissolved oxygen. Preferably, the process further comprises storing the separated zero-valent iron in ethanol. In one aspect, the alkali metal borohydride is mixed as a powder with the acid mine drainage feedstock. Preferably, the alkali metal borohyride powder has a mean particle size of from about 20 to about 200 mesh. Preferably, the alkali metal hydride is mixed as an aqueous solution with the acid mine drainage feedstock. Preferably, from about 0.5 to 0.8 g alkali metal hydride per gram of iron ion is mixed with the acid mine drainage feedstock. Preferably, the alkali metal hydride is mixed with the acid mine drainage feedstock at a rate of from about 500 g to about 600 g alkali metal hydride per gram of iron ion per minute yielding 750 g to 1,000 g zero-valent iron. In another aspect, the effluent includes manganese ion, and the process further comprises further treating the effluent to precipitate maganese ion from the effluent.

DETAILED DESCRIPTION

The present invention provides a process for preparing zero-valent iron nanoparticles. The process of the present invention can be carried out as a batch process or as a continuous process. The process permits the separation of dissolved iron from acid mine drainage. Dissolved iron is a major constituent of acid mine drainage. In addition to the dissolved iron, acid mine drainage frequently includes significant concentrations of other heavy metals, such as manganese. The present process permits dissolved iron to be separated from the acid mine drainage in the form of nano zero-valent iron, which can be subsequently employed for enviromental remediation purposes. After removal of the zero-valent iron, the acid mine drainage can be subsequently treated to precipitate other heavy metals such as manganese which may be present and remove the heavy metal precipitate(s) from the acid mind drainage.

Preferably, since the chemical properties of acid mine drainage can vary significantly depending on the source of the acid mine drainage, the chemical properties, including the pH and the concentration of ferrous and ferric ions, manganese ion, et al., are measured before initiating the treatment process. Preferably, the concentration of iron ions in the acid mine drainage is at least about 50 ppm, more preferably from about 50 ppm to about 500 ppm, still more preferably from about 100 ppm to about 400 ppm, and still more preferably from about 200 to 300 ppm. While either acid mine drainage containing either ferric or ferrous ions or a mixture of ferric and ferrous ions can be employed in the present process, acid mine drainage including iron in the lower oxidation state is preferred since the amount of reducing agent required to form the zero-valent iron and corresponding operation costs are correspondingly reduced. Sodium borohydride, potassium borohydride, or mixtures of the two can be employed as alkali metal borohydride reducing agents, however, sodium borohydride is presently preferred. The alkali metal borohydride can be in the form of a powder or granular material, or in the form of an aqueous solution, such as an aqueous solution of sodium borohydride and sodium hydroxide available from Montgomery Chemicals, Conshohocken, Pa. When a sodium borohydride powder is employed, the particle size and corresponding surface area of the powder can affect the rate at which the powder is mixed with the acid mine discharge. Similarly, when an aqueous solution of sodium borohydride is employed the concentration of sodium borohydride may affect the rate at which the aqueous solution is mixed with the acid mine discharge.

Zero-valent iron is susceptable to oxidation from dissolved oxygen in the acid mine drainage. To minimize the extent of oxidation, the acid mine drainage is preferably purged with an inert gas such as nitrogen or argon prior to reducing the iron ions to metallic zero-valent iron with the alkali metal borohydride. Preferably, the reduction reaction takes place in a reactor vessel isolated from the atmosphere and/or continuously purged with an inert gas to minimize the level of dissolved oxygen in the reaction mixture.

The reduction reaction of ferrous/ferric ion with borohydride ion has been found to be sufficiently rapid such that reduction of the iron will take place below a pH of about 8, and faster than the rapid hydrolysis of the borohydride in the acid mine drainage. Thus, zero-valent iron is formed, and the formation of insoluble iron and/or manganese oxide, hydroxide or carbonate is avoided.

The particle size of the zero-valent iron is a function of the rate of addition of sodium borohydride. For example, when sodium borohydride is added at a slow rate, such as over an interval of 10 to 15 minutes, the pH of the acid mine drainage increases slowly, and the particle size of the resulting zero-valent iron is in the range of 50 to 200 nm. In contrast, when the sodium borohydride is added at a faster rate, such as over an interval of 2 to 5 minutes, then the pH increases rapidly, and particle size of the resulting zero-valent iron is in the range of 100 to 300 nm. Thus, the mean particle size of the zero-valent iron can be controlled by controling the rate of addition of the sodium borohydride.

Optionally, the particle size of the zero-valent iron can be controlled by addition of a suitable polymeric thickener material such as carboxymethylcellulose.

It is presently understood that the rate of hydrolysis is given by:

$$\text{Hydrolysis rate} = k_{hyd}[H^+][BH_4^-]$$

And the reduction rate is given by:

$$\text{Reduction rate} = k_{Fe}([Fe^{2+}]/[H^{3O}])[BH_4^-]$$

Thus, there are two effective first-order rate constants (with respect to borohydride), $k_{hyd}[H^+]$ and $k_{Fe}[Fe^{2+}]/[H^+]$, or $k_w$ and $k_{red}$ respectively. $k_w$ will decrease with pH and $k_{red}$ will increase with pH. If $k_w$ is 10 times faster than with $k_{red}$ for the given iron content, even at pH 7.5, then more borohydride is required to speed the reaction with the iron. The reason is simple: if there are two parallel reactions, B and C involving the same reactant, A (i.e. $BH_4^-$ in this case), then:

$$d[B]/dt=-k_1[A] \quad d[C]/dt=-k_2[A] \quad d[A]/dt=-(k_1+k_2)[A]$$

So $$[A]=[A]_0 \, e^{-(k_1+k_2)t} \text{ and } [C]=[C]_0-(k_2/(k_1+k_2))[A]_0 (1-e^{-(k_1+k_2)t})$$

Therefore, the slow C reactant (assuming B is the fast one) will only use up a fraction $(k_2/(k_1+k_2))$ of reactant A. As a result, if reduction is 10 times slower than hydrolysis, 10 times the borohydride is required to reduce all of the iron. Similarly, if reduction is 100 times slower, then we need 100 times higher borohydride concentration to reduce all of the ferrous iron.

Figure 1:
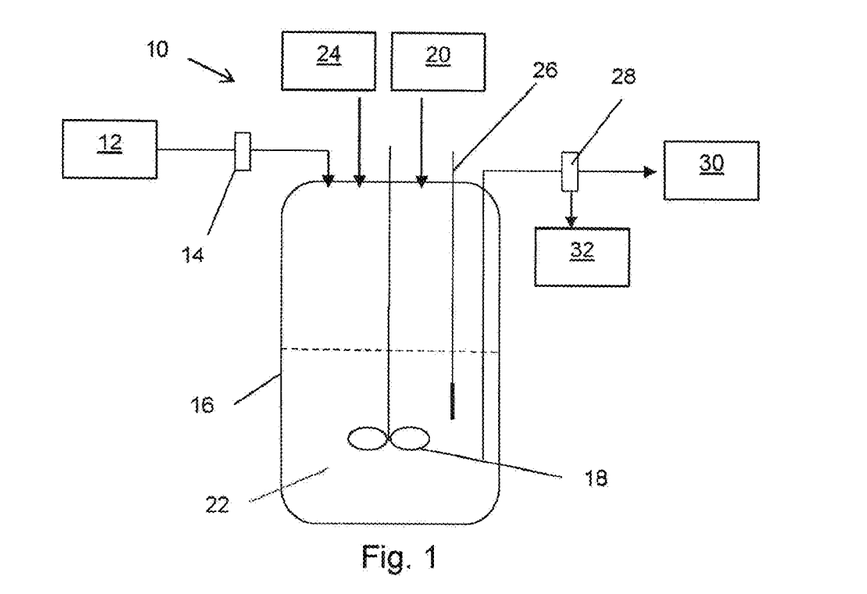
FIG. 1 is a schematic view of an apparatus for carrying out the process of the present invention.
Figure 2:
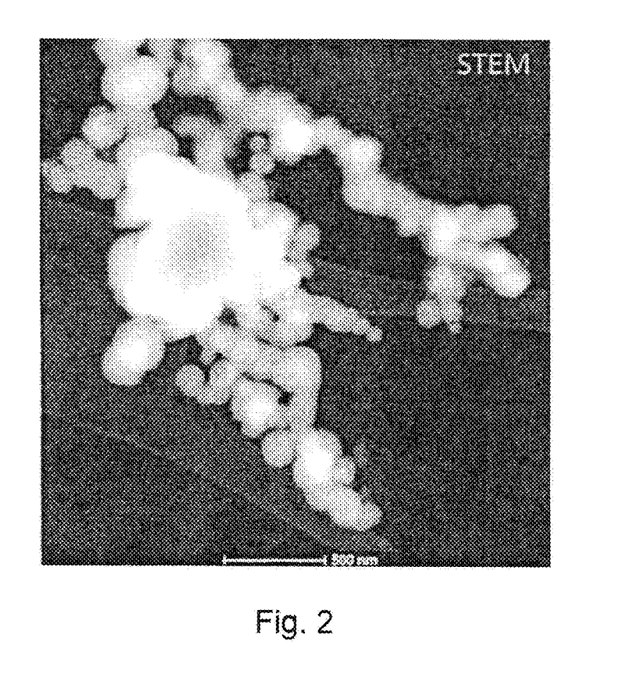
FIG. 2 is a HAADF-STEM image of a sample of zero-valent iron produced by the process of the present invention.

The process of the present invention can be carried out in a batch mode or as a continuous process. An apparatus for carrying out the process in batch mode is shown in FIG. 1. Untreated acid mine discharge 12 is passed through a prefilter 14 to remove particulate matter (e.g. larger than 20 microns) and deliver to a closed reactor 16 in which the acid mine discharge is continuously mixed by a mixing device 18. Nitrogen is continously delivered to the reactor 16 from a tank 20 to purge oxygen containing air from interior of the reactor 16 and especially from the reaction mixture 22 in the reactor 16. Sodium borohydride is added to the reaction mixture through an injection port 24, and the pH and electrode potential of the reaction mixture 22 is monitored using a pH meter 26 as the sodium borohydride is added. When the reaction mixture attains a preselected pH, the reaction mixture 22 is withdrawn from the reactor 16 by suitable means, such as a pump (not shown), and passed through an electromagnetic filter 28 which separates zero-valent iron 32 from the reaction mixture 22 to produce a treated acid mine discharge 30. The zero-valent iron 32 is subsequently removed from the electromagnetic filter 28 and stored in ethanol to prevent oxidation.

Example 1

A sample of acid mine drainage ("AMD") was obtained from the Clyde mine site in Fredericktown, Pa. One liter of the AMD sample was filtered using a 20μ cartridge filter. The pH of the AMD sample was 6.49, and the sample contained 227.6 ppm iron, 6.83 ppm manganese, and 0.87 ppm dissolved oxygen. The AMD water sample was purged with nitrogen while mixing in the closed system shown schematically in FIG. 1. After about 3 to 5 minutes, 0.01 g aliquots of solid sodium boroyhdride powder reducing agent were added to the AMD sample through a chemical injector port and mixed, and after mixing for about one minute for each aliquot, the pH of the resulting mixture was measured, as reported in Table A below, along with electrochemical potential of the mixture, and a sample of the reaction mixture was withdrawn from the reactor and visually inspected. Addition of the 0.01 aliquots of the sodium borohydride powder continued until the pH of the resulting mixture was measured as 8.05. Hydrogen evolution from the mixture was apparent when the pH was 6.6. The resulting mixture as stirred for an additional 5 to 7 minutes and then passed through a magnetic filter to collect black zero-valent iron particles. After collection of the zero-valent iron particles, the resulting mixture was measured to have a pH of 8.13, 1.80 ppm iron, 4.77 manganese, and 1.34 ppm dissolved oxygen.

The zero-valent iron produced was subjected to chemical and physical analysis at the Penn State Materials Research Institute. Samples were prepared by sonicating the sample to disperse particles in solution. A needle was inserted into a rubber stopper to extract a small amount of the solution. The solution was drop cast on a lacey carbon transmission electron microscope (TEM) support grid and immediately inserted into the TEM under vacuum. The sample was exposed to atmosphere for less than five minutes. TEM and scanning transmission electron microscopy ("STEM") were carried out using a Talos TEM at 200 kV (ThermoFisher Scientific) Energy-dispersive X-ray spectroscopy ("EDS") mapping was carried out to investigate the composition of particles. High angle annular dark field STEM ("HAADF") providing a better mass contrast than TEM was also carried out, as the contrast was approximately proportional to $Z^2$, and reversed as compared to TEM.

FIGS. 2-5 are electron micrographs showing results of the analyses of the zero-valent iron produced by the present process. The images show large round elemental Fe particles approximately 100-300 nm in diameter with a thin oxide shell (~5 nm thick). Other elements present include Ca, Na, Mg, K, S. The results of EDS quantification of the elemental composition of a sample of the zero-valent iron particles are reported in Table B. With the exception of Fe, O, Ca, most other elements seen in spectrum are at very low levels. Quantification shows four different compositions corresponding most likely to elemental iron, iron oxide, silicon oxide, and calcium oxide.

TABLE A

| Sodium borohydride (g) | pH | mV | Notes |
|---|---|---|---|
| 0 | 6.49 | 7.8 | |
| 0.01 | 6.51 | 1 | |
| 0.02 | 6.53 | −3 | |
| 0.03 | 6.6 | −5.6 | $H_2$ gas evolves |
| 0.04 | 6.72 | −9.1 | |
| 0.05 | 6.78 | −13.4 | |
| 0.06 | 6.86 | −16.3 | |
| 0.07 | 6.93 | −19.8 | |
| 0.08 | 7.02 | −25 | |
| 0.09 | 7.11 | −29.8 | |
| 0.1 | 7.25 | −36.3 | |
| 0.11 | 7.32 | −42 | |
| 0.12 | 7.5 | −50 | Yellow/green magnetic ppt. |
| 0.13 | 7.58 | −55.3 | Magnetic ppt. |
| 0.14 | 7.62 | −60.5 | Dark green magnetic ppt. |
| 0.15 | 7.75 | −65.5 | Magnetic ppt. |
| 0.16 | 7.83 | −71.3 | Black, magnetic ppt. |
| 0.17 | 7.94 | −77 | Magnetic ppt. |
| 0.18 | 8.05 | −80 | Magnetic ppt. |

TABLE B

| Element | Series | Net | Mass C. (wt. %) | Norm. C. (wt. %) | Atom C. (at. %) | Error (3 sigma) (wt %) |
|---|---|---|---|---|---|---|
| S | K series | 527 | 0.42 | 0.42 | 0.57 | 0.14 |
| Fe | K series | 79988 | 83.82 | 83.82 | 66.05 | 7.68 |
| O | K series | 11101 | 9.25 | 9.25 | 25.44 | 0.95 |
| C | K series | 0 | 0 | 0 | 0 | |
| Na | K series | 890 | 0.60 | 0.60 | 1.14 | 0.16 |
| Mg | K series | 535 | 0.39 | 0.39 | 0.71 | 0.14 |
| K | K series | 1078 | 0.88 | 0.88 | 0.99 | 0.19 |
| Ca | K series | 5366 | 4.65 | 4.65 | 5.11 | 0.54 |

It was found that at low pH-reaction yield was low and some Group I and Group II chemical particle contamination was observed. At pH 8.3, higher iron nano crystals yield was observed as well as Group I and Group II chemical particles contamination was observed. The nano crystals formed in the process were highly magnetic. No radioactive materials were contained in the samples according to lab results. During the reaction nano crystals particle size could be controlled in the range 50-300 nm by controlling the rate of addition of the borohydride.

Example 2

The process of Example 1 was repeated, except that an aqueous solution of 10 percent by weight sodium borohydride; 4 percent by weight sodium hydroxide was prepared from a solution of 12 percent sodium borohydride and 40 percent sodium hydroxide (BoroSpec™ 1240, Montgomery Chemicals, Conshohocken, Pa.) which was diluted 1:10 with distilled water, to which was added 8.8 g sodium borohydride dissolved in 100 ml water to form a reducing agent. After purging a one liter sample of the AMD with nitrogen for around 3 to 5 minutes, 100 microliter aliquots of the reducing agent were added to the reaction mixture in the reactor and stirred, and samples were withdrawn for visual inspection, until the measured pH of the reaction mixture was 8.15. The reaction mixture was stirred for an additional 5 to 7 minutes and the treated reaction mixture was then passed through a filter to collect black zero-valent iron particles. Results are reported in Table C.

TABLE C

| Sodium borohydride (µL) | pH | Notes |
| --- | --- | --- |
| 0 | 6.49 | |
| 100 | 6.55 | |
| 200 | 6.7 | |
| 300 | 6.77 | |
| 400 | 6.88 | |
| 500 | 7.13 | |
| 600 | 7.25 | |
| 700 | 7.34 | M* |
| 800 | 7.44 | M |
| 900 | 7.48 | M |
| 1000 | 7.56 | M |
| 1100 | 7.72 | M |
| 1200 | 7.8 | M |
| 1300 | 7.88 | M |
| 1400 | 7.95 | M |
| 1500 | 8.05 | M |
| 1600 | 8.19 | M |

*Indicates back magnetic iron precipitate.

Example 3

Figure 3:
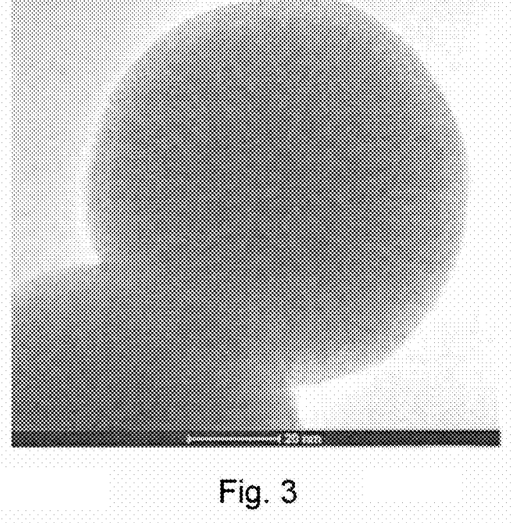
FIG. 3 is a higher magnification TEM image of the sample of FIG. 2 showing details of the internal structure.
Figure 4:
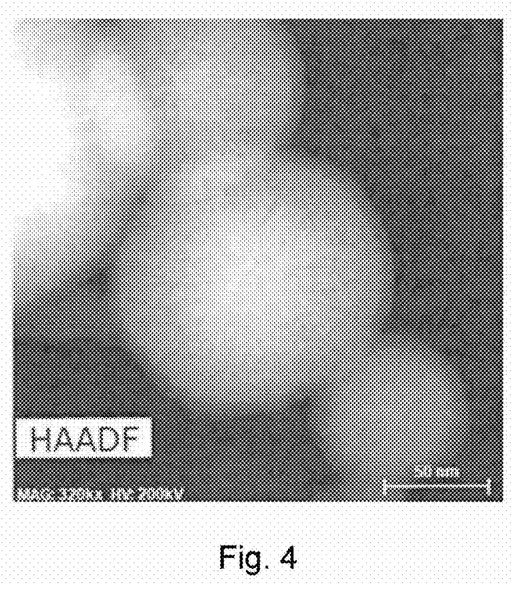
FIG. 4 is a higher magnification HAADF-STEM image showing an oxide shell around the zero-valent iron particles of the sample of FIG. 2.
Figure 5:
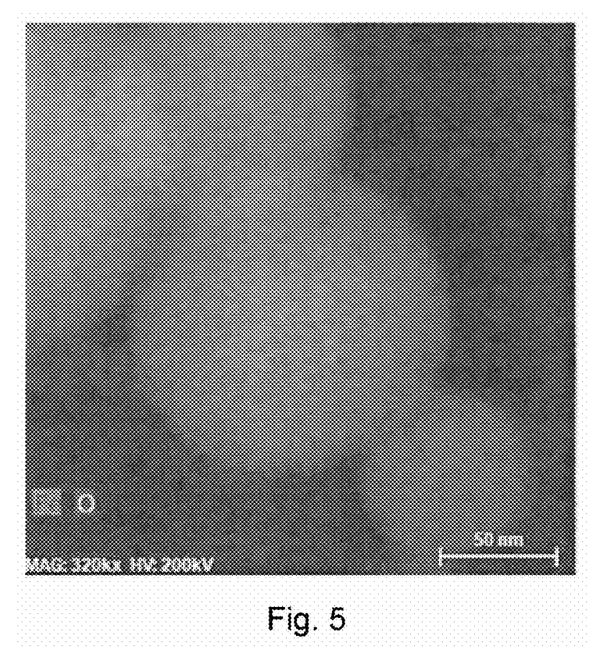
FIG. 5 is a higher magnification HAADF-STEM/EDS image showing an oxide shell around the zero-valent iron particles of the sample of FIG. 4.
Figure 6:
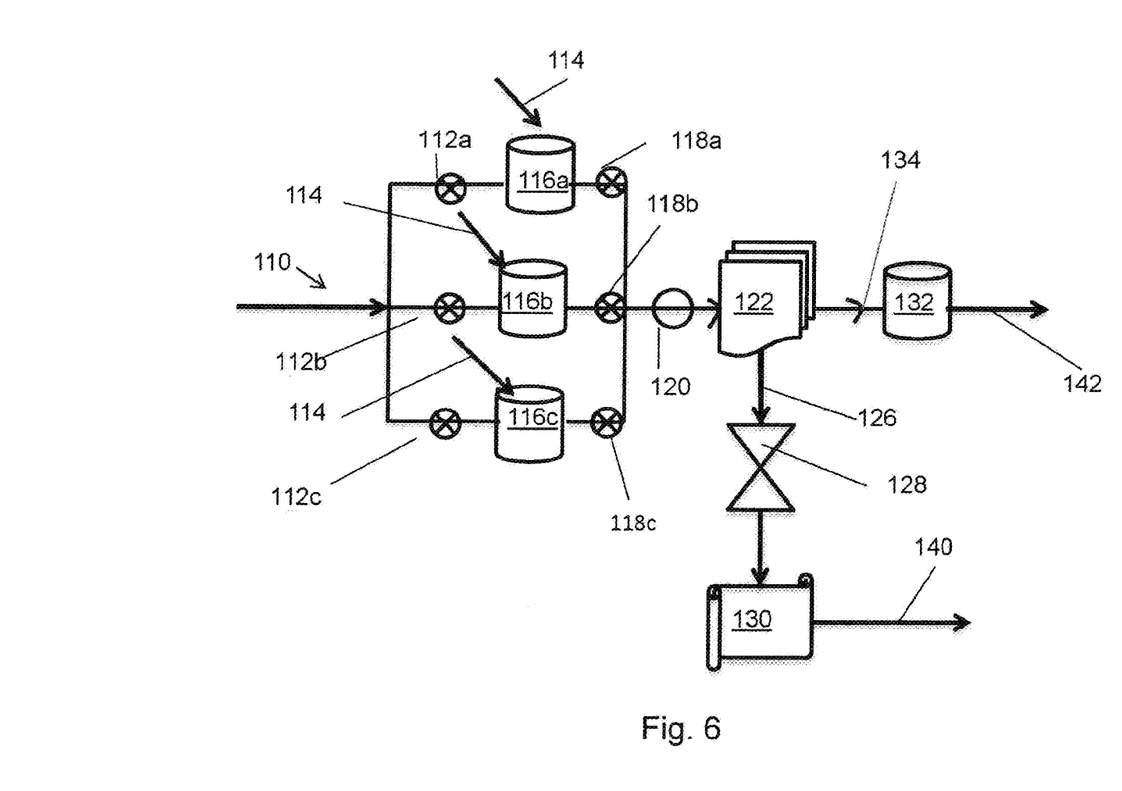
FIG. 6 is a schematic diagram showing a continuous implementation of the process of the present invention.

A continuous implementation 100 of the process of the present invention is shown schematically in FIG. 3. Prefiltered acid mine drainage 110 is supplied at about 1000 gallons per minute. The AMD has a pH of 6.48 and includes about 200 to 250 ppm iron ions, and is supplied through volume control solenoids 1121*a*, 112*b*, 112*c*, to nitrogen purged treament tanks 116*a*, 116*b*, 116*c*. Sodium borohydride is added through injection ports 114*a*, 114*b*, 114*c* and the reaction mixture in each tank 116*a*, 116*b*, 116*c* is stirred to reduce the iron ions to zero-valent iron. The pH in each tank 116*a*, 116*b*, 116*c* is monitored, and when the pH is about 8.1, the contents of the tanks is withdrawn by a pump 120 through pH control valves 118*a*, 118*b*, 118*c* and the reaction mixture is flowed through a magnetic filter unit 122. The treated acid mine waste 134 is stored in treated wastewater storage tank 132 for subsequent treatment or disposal 142. The zero-valent ion 126 is washed from the magnetic filter 122 with ethanol and the resulting effluent is treated in a drying device 128 and the ethanol is recycled while the zero-valent iron is sent to a packaging device 130 to provide a packaged material isolated from atmospheric oxygen.

Various modifications can be made in the details of the various embodiments of the articles of the present invention, all within the scope and spirit of the invention and defined by the appended claims.

The invention claimed is:

1. Process for producing zero-valent iron and treating acid mine drainage, the process comprising:
   a) providing aqueous acid mine drainage feedstock including from 50 ppm to 500 ppm of metal ion selected from the group consisting of ferrous iron, ferric iron, and mixtures thereof at a pH of less than 6.9,
   b) providing an alkali metal borohydride selected from the group consisting of sodium borohydride, potassium borohydride and mixtures thereof,
   c) mixing the alkali metal borohydride with the acid mine drainage feedstock to form an aqueous suspension of zero-valent iron, wherein the alkali metal borohydride is mixed as a powder with the acid mine drainage feedstock.

2. Process for producing zero-valent iron and treating acid mine drainage, the process comprising:
   a) providing aqueous acid mine drainage feedstock including from 50 ppm to 500 ppm of metal ion selected from the group consisting of ferrous iron, ferric iron, and mixtures thereof at a pH of less than 6.9,
   b) providing an alkali metal borohydride selected from the group consisting of sodium borohydride, potassium borohydride and mixtures thereof,
   c) mixing the alkali metal borohydride with the acid mine drainage feedstock to form an aqueous suspension of zero-valent iron, wherein from about 0.5 to 0.8 g alkali metal hydride per gram of iron ion is mixed with the acid mine drainage feedstock.

3. Process according to claim 1 wherein the amount of alkali metal borohydride mixed with the acid mine drainage feedstock is sufficient to raise the pH of the aqueous suspension to no more than 8.3.

4. Process according to claim 3 wherein the amount of alkali metal borohydride is sufficient to raise the pH of the aqueous suspension to from about 7.90 to about 8.15.

5. Process according to claim 1 wherein the acid mine drainage feedstock includes from about 100 ppm to about 400 ppm of metal ion.

6. Process according to claim 5 wherein the acid mine drainage feedstock includes from about 200 ppm to about 300 ppm of metal ion.

7. Process according to claim 1 wherein the metal ion comprises at least 90 percent by weight ferrous iron.

8. Process according to claim 1 further comprising providing an inert atmosphere, and mixing the alkali metal borohydride with the acid mine drainage feedstock under an inert atmosphere.

9. Process according to claim 1 further comprising separating the zero valent iron from the aqueous suspension to provide separated zero-valent iron and an effluent.

10. Process according to claim 9 wherein the zero-valent iron is separated by filtration.

11. Process according to claim 9 wherein the zero-valent iron is separated magnetically.

12. Process according to claim 9 further comprising storing the separated zero-valent iron in a medium having less than 5 ppm dissolved oxygen.

13. Process according to claim 9 further comprising storing the separated zero-valent iron in ethanol.

14. Process according to claim 1 wherein the alkali metal borohydride powder has a mean particle size of from about 75 nm to about 150 nm.

15. Process according to claim 9 wherein the effluent includes manganese ion, and the process comprises further treating the effluent to precipitate manganese ion from the effluent.

16. Process according to claim 1 wherein the acid mine drainage feedstock is provided at a pH of from about 6.1 to 6.8.

17. Process according to claim 16 wherein the acid mine drainage feedstock is provided at a pH of from about 6.4 to 6.6.

18. Process according to claim 1 wherein the rate of addition of the alkali metal borohydride to the acid mine drainage is controlled to control the particle size of the resulting zero-valent iron.

* * * * *

UNITED STATES PATENT AND TRADEMARK OFFICE
CERTIFICATE OF CORRECTION

PATENT NO. : 10,927,021 B2
APPLICATION NO. : 16/012986
DATED : February 23, 2021
INVENTOR(S) : Lumsden et al.

It is certified that error appears in the above-identified patent and that said Letters Patent is hereby corrected as shown below:

In the Specification

Column 4, Line 60, the equation should read as follows: -- Reduction rate = $kFe\,([Fe^{2+}]/[H^+])\,[BH_4^-]$ --

Column 6, Line 9, change "Talcs" to -- Talos --

Column 6, Line 20, change "-5" to -- ~5 --

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*